Aug. 8, 1939. H. KÖHL 2,168,956
CHANGE SPEED GEAR FOR POWER VEHICLES
Filed Feb. 17, 1937 3 Sheets-Sheet 1
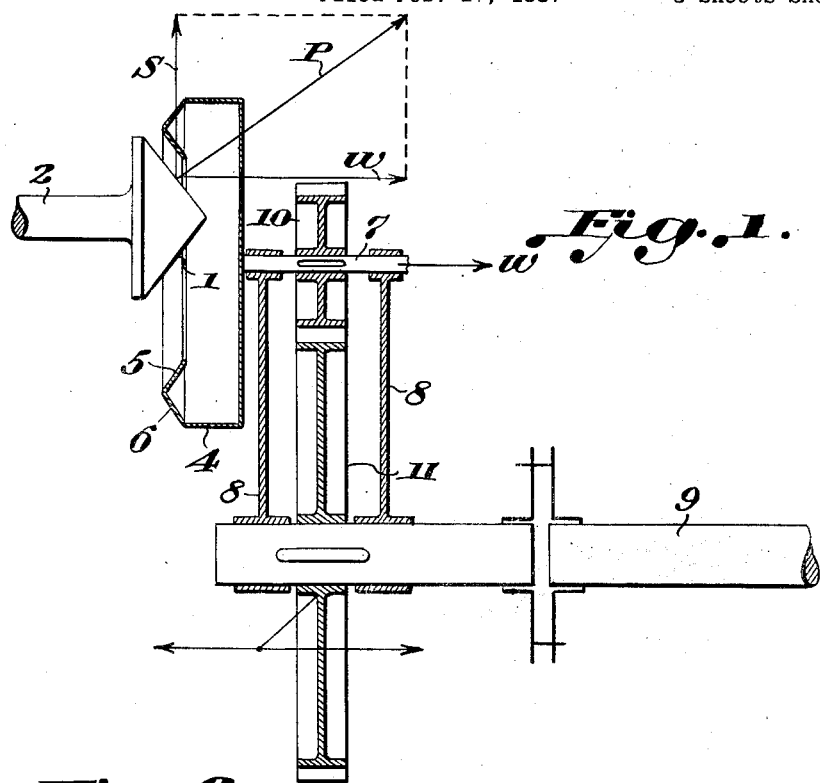
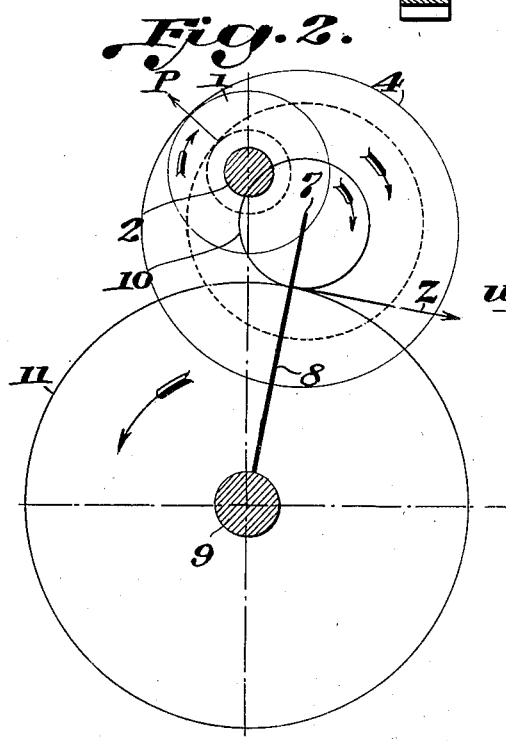
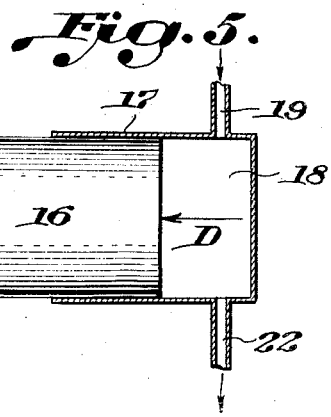
Inventor,
Hermann Köhl
By Young, Emery, Thompson Attys.

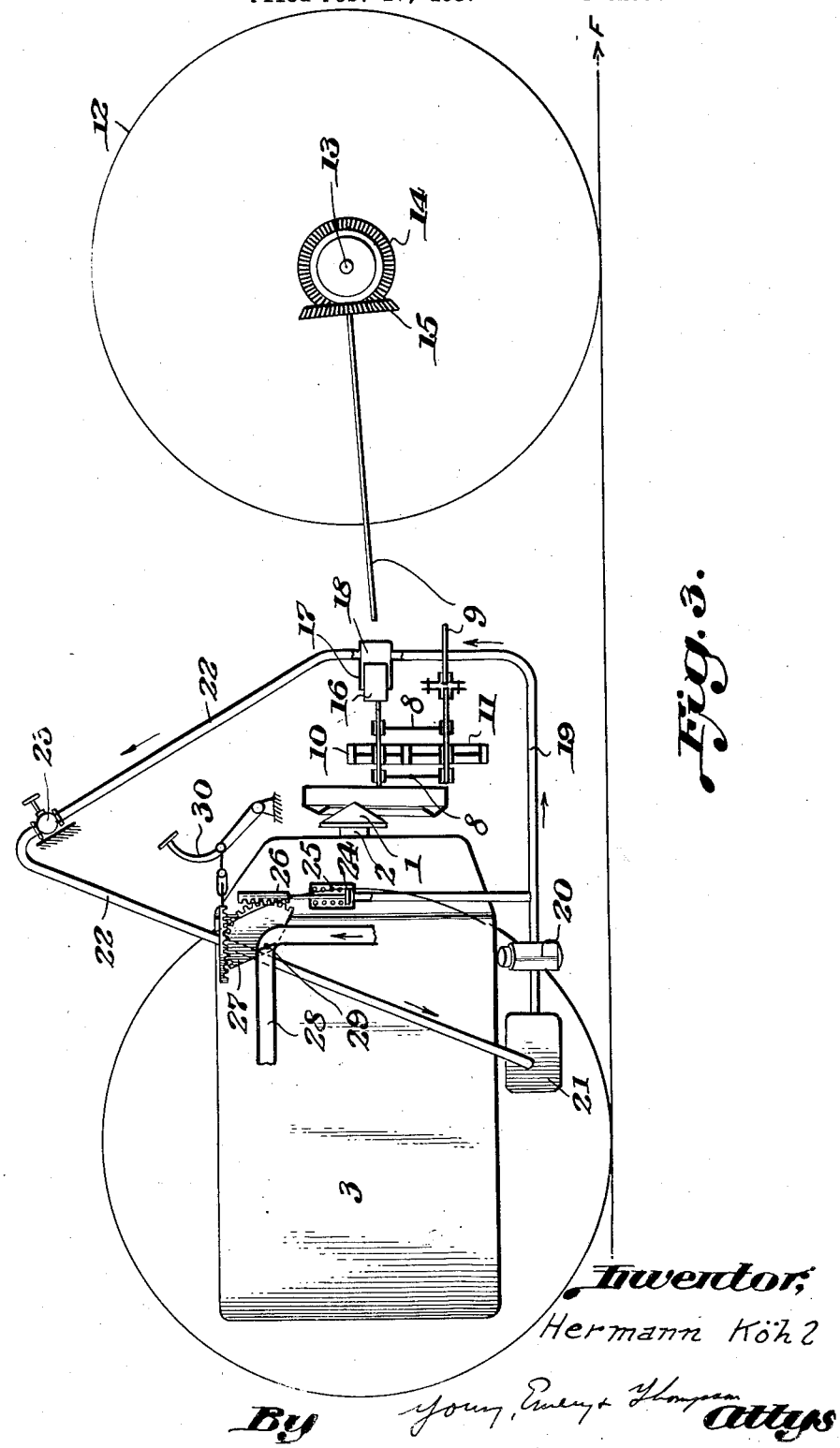

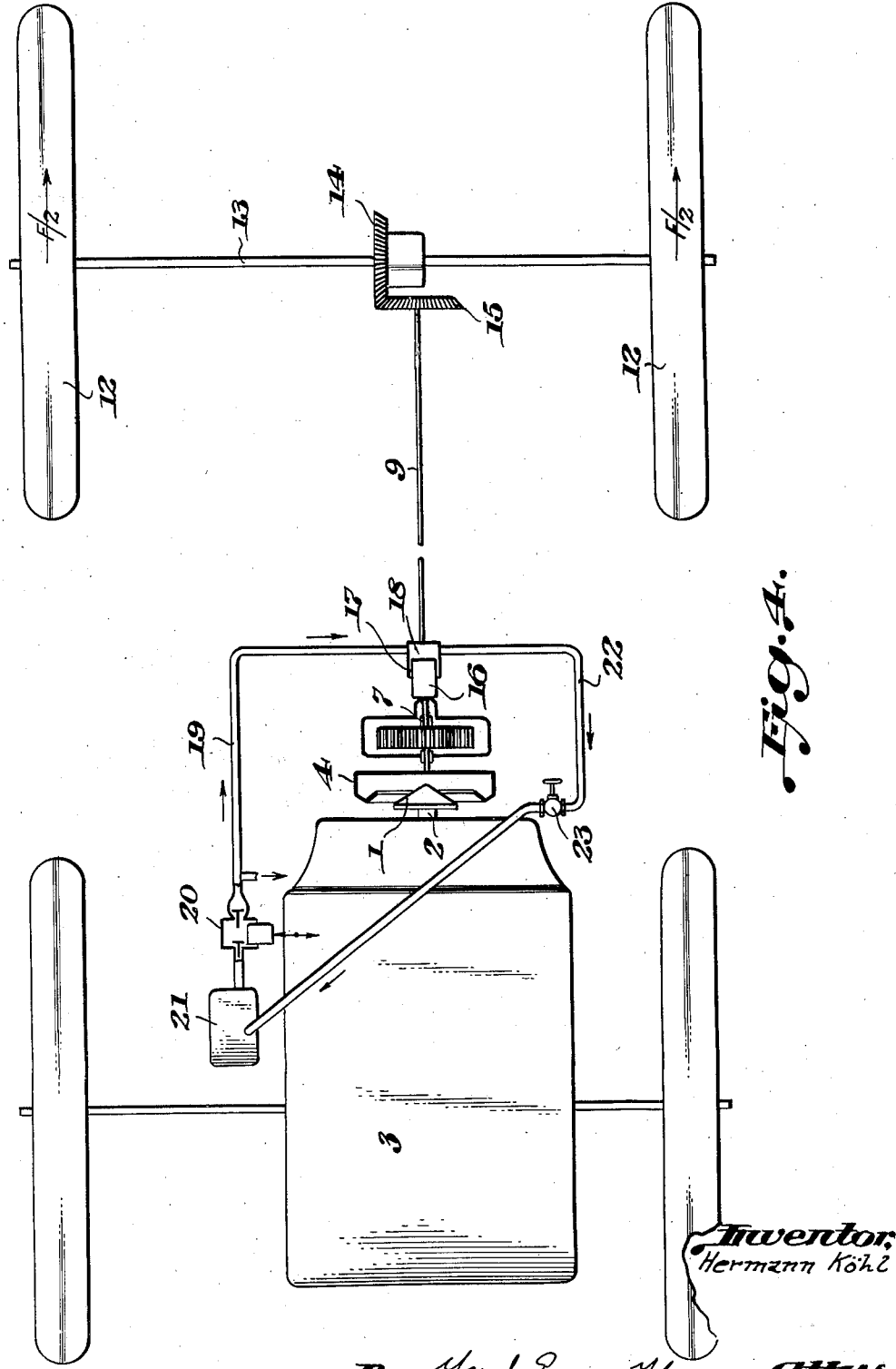

Patented Aug. 8, 1939

2,168,956

UNITED STATES PATENT OFFICE 2,168,956

CHANGE SPEED GEAR FOR POWER VEHICLES

Hermann Köhl, Stolberg, Germany, assignor, by mesne assignments, to P K Drive Corp., Jersey City, N. J., a corporation of New Jersey Application February 17, 1937, Serial No. 126,294
In Germany December 7, 1936

7 Claims. (Cl. 74—190.5)

This invention relates to change speed gears for motor vehicles of the kind in which the power of the motor is transmitted through a stepless friction gearing to the drive shaft or shafts of the vehicle. According to the invention the contact of the friction gears and the variation of the velocity ratio is effected solely by shifting the driven friction wheel, this being effected by a member which is under the influence of the drive resistance and also that of the revolutionary speed or power of the motor.

By means of this two-fold control of the member for shifting the driven friction wheel it is possible, with any setting to a predetermined drive condition, to automatically correlate the drive resistance and the power of the drive motor to each other in such a manner that the most favorable speed, (or velocity ratio of the change speed gear) will be automatically assumed at any time according to the grade of the road. By limiting the shifting solely to the driven friction wheel, unfavorable loading of the driving friction wheel is avoided so that the latter can be connected to the motor by short and rigid connections. Furthermore, all control pressures are concentrated at the driven friction wheel which alone varies its position, so that these pressures are available in full force to effect the automatic speed changes.

The drive resistance can be transmitted to the member effecting the shifting of the driven friction wheel, through the axial reaction of the driving friction cone on the driven friction wheel. These friction wheels are arranged with their axes parallel to each other, and the driven friction wheel is arranged to pivot in its plane or in planes parallel thereto about the Cardan shaft, and operates the latter through a sprocket chain permitting this swinging movement. The arrangement of the wheels for the sprocket chain and their direction of rotation is such that the tooth pressures caused by the drive resistance operate to create contact pressure between the friction wheels. The power of the motor can be transmitted to the member producing the shifting of the driven friction wheel by means, for example of a liquid or gaseous medium, which is circulated in a throttled conduit by means of a pump driven by the motor, and under a pressure varying with the revolutionary speed of the motor.

The pressure of this medium, which is transmitted to the member producing the shifting of the driven friction wheel under the action of the drive resistance, can be made dependent on the supply of fuel medium to a motor. Preferably also means are provided whereby the supply of the motor with fuel medium can also be regulated mechanically by a member (accelerator lever) under control of the driver.

The arrangement according to the present invention permits wide range velocity ratio between the motor and the Cardan shaft, whereby the latter does not have to run faster than the driven axle or shaft. Thereby the difficulties caused by the vibration of high speed Cardan shafts are overcome.

Mechanism according to the invention is illustrated diagrammatically in the accompanying drawings in which:

Figure 1 is a diagrammatic view of the transmission gear between the motor and the Cardan shaft, the parts being shown in cross section in the direction of the longitudinal axis of the wheel;

Fig. 2 is a plan view of the gear;

Fig. 3 shows the gear associated with the vehicle drive;

Fig. 4 is a plan view of Fig. 3, and

Fig. 5 illustrates diagrammatically the member for shifting the driven friction gear.

In the gear shown in Figs. 1 and 2 a driving friction cone or wheel 1 is keyed directly on the shaft 2 of the motor 3 of Figs. 3 and 4. The driving friction cone 1 cooperates with the driven friction wheel 4 which has a conical internal friction surface 5 and a corresponding external friction surface 6. In forward travel of the vehicle the drive cone 1 is brought into engagement with the friction surface 5 and in reverse travel with the friction surface 6. The driven wheel 4 is fixed on a shaft 7 which is mounted for swinging about the Cardan shaft 9, in rocker arms 8. Toothed gears 10 and 11 of which the gear 10 is keyed on the shaft 7 and the gear 11 on the Cardan shaft 9 positively transmit the drive from the shaft 7 to the Cardan shaft 9.

The drive resistance F, for example taken at the circumference of the rear wheels 12 (Figs. 3 and 4), there being a resistance F/2 at each rear wheel, is transmitted over the rear axle 13 and the differential 14, 15, to the Cardan shaft 9. To this resistance there corresponds the tooth resistance Z at the circumference of the gear 11, with the directions of rotation indicated in Fig. 2, which tooth resistance exerts a couple on the rocker arm 8 which produces the contact pressure P, Fig. 1 between the friction wheels 1 and 4.

This contact pressure P operates at right angles to the conical surface of the friction wheel 1 and can be resolved into a vertical component S and a horizontal component W. The latter acts at the friction wheel 4 as a reaction of the friction cone 1 on the friction wheel 4. This reaction is at any time proportional to the drive resistance F and tends to swing the rocker arms 8 away from the friction cone 1. This side pressure W, on the rocker arms 8 or the shaft 7 of the friction wheel 4, is transmitted, according to the present invention, to a member 16, which may consist for example as shown in Fig. 5 of a piston movable in a cylinder 17.

A pipe connection 19 communicates with the inner space 18 of the cylinder 17, into which pipe is forced a liquid or gaseous medium, for example oil, by means of a pump 20, Figs. 3 and 4, driven by the motor 3. The oil flows or is forced from a tank 21 to the pump and then the pipe 19 into the cylinder space 18 from which it is returned, through a pipe 22, to the tank 21. While the motor 3 is operating there is thus a continuous flow of liquid through the pipes 19 and 22, the kinetic energy of which flow depends upon the power of the pump 20 which is proportional to the revolutionary speed and power of the motor 3.

In order to render the kinetic energy of the liquid flowing in the pipes 19, 22 available for control operations, a throttle valve 23 is inserted in the pipe 22 which by adjustment thereof develops a liquid pressure in the pipe 19, 22. This liquid pressure D, Fig. 5, operates in the cylinder space 18 on the rear end of the piston or member 16. In this manner the position of the member 16 is under the influence of the drive resistance transmitted from the driving friction cone 1 through the friction wheel 4 and its shaft or the rocker arms 8, and is also, by means of the pressure of the circulating liquid, under the influence of the revolutionary speed or the power of the motor. Both these influences in combination determine the position at any instant of the member 16, or the magnitude of the available cylinder space 18, that is the total liquid pressure.

Since owing to the reaction W exerted by the driving friction cone 1, the shaft 7 or the rocker arms 8 remaining constantly in contact with the member 16, the axial separation of the friction wheel 4 from the stationary friction cone 1 depends at any time on the position of the member 16, that is on the condition of equilibrium between the drive resistance and motor power or revolutionary speed. Since the friction wheel 4 is arranged to swing orbitally about the Cardan shaft 9, axial shifting of the friction wheel 4 causes its automatic vertical adjustment relatively to the place of contact at any instant against the surface of the drive cone 1 under the counter pressure of the force component S, with outward rocking of the friction wheel 4 in its plane or in planes parallel thereto.

The total fluid pressure built up in the pipe 19, 22 can also be used simultaneously for varying the supply of fuel to the motor 3. In the case of an automobile engine this may be effected by causing the liquid pressure to operate on a piston 24, Fig. 3, which is under the action of a spring 25 and which operates through a rod mechanism or the like 26, 27 to the throttle 29 in the suction manifold 28 of the engine.

To enable the driver also to exert control on the setting of the throttle 29, a pedal or accelerator lever 30 may be provided which by shifting in known manner results in a mechanical operation of the throttle 29 which can be effected independently of its setting at any instant due to the liquid pressure. Obviously the action of the total liquid pressure, and the mechanical or pedal shifting by the driver, may operate on other members serving to supply fuel to the motor or to control the revolutionary speed or power of the motor.

I claim as my invention:

1. A change speed gear for power vehicles, comprising a driving friction wheel, a driven friction wheel, means for mounting the driven friction wheel so that it may be shifted relative to the driving friction wheel, means for changing the velocity ratio of the friction wheels by shifting the driven friction wheel, said last-mentioned means being under the influence of the drive resistance and the revolutionary speed or power of a motor of the power vehicle, and a Cardan shaft on which the driven wheel is swingably mounted, the axis of rotation of the friction wheels being parallel to each other, and the driven wheel when shifted, swinging orbitally about the Cardan shaft.

2. A change speed gear for power vehicles, comprising a driving friction wheel, a driven friction wheel, means for mounting the driven friction wheel so that it may be shifted relative to the driving friction wheel, means for changing the velocity ratio of the friction wheels by shifting the driven friction wheel, said last-mentioned means being under the influence of the drive resistance and the revolutionary speed or power of a motor of the power vehicle, a Cardan shaft, a shaft for the driven friction wheel, and a gear on each shaft intermeshing with each other, the tooth pressure between the cooperating gears creating the contact pressure between the friction wheels.

3. A change speed gear according to claim 1, in which a pressure fluid system is provided for actuating the last-mentioned means whereby the fluid system is subjected to a working pressure changing with the speed of the motor.

4. A change speed gear according to claim 1, in which a pressure fluid system is provided for actuating the last-mentioned means whereby the fluid system is subjected to a working pressure changing with the speed of the motor, said system including a closed conduit having a pump driven by the motor.

5. A change speed gear according to claim 1, in which a pressure fluid system is provided for actuating the last-mentioned means whereby the fluid system is subjected to a working pressure changing with the speed of the motor, said system including a closed conduit having a pump driven by the motor and means in the fluid pressure system to control the supply of fuel medium to the motor.

6. A change speed gear according to claim 1, in which a pressure fluid system is provided for actuating the last-mentioned means whereby the fluid system is subjected to a working pressure changing with the speed of the motor, said system including a closed conduit having a pump driven by the motor and means in the fluid pressure system to control the supply of fuel medium to the motor and connected to a means for mechanically regulating the supply of fuel.

7. A change speed gear according to claim 1, in which the driving friction wheel is cone-shaped and the driven friction wheel is provided with an internal friction surface and an external friction surface for forward and reverse direction of the vehicle, said cone cooperating with one of the friction surfaces when the vehicle is in motion.

HERMANN KÖHL.